United States Patent [19]
Kuhn et al.

[11] Patent Number: 5,483,790
[45] Date of Patent: Jan. 16, 1996

[54] ROTATING MOWER BAFFLE MACHANISM

[75] Inventors: John B. Kuhn, Rubicon; Daniel J. Kettler, Horicon; David K. Stricker, Columbus, all of Wis.

[73] Assignee: Deere & Company, Moline, Ill.

[21] Appl. No.: 212,071

[22] Filed: Mar. 11, 1994

Related U.S. Application Data

[63] Continuation-in-part of Ser. No. 121,817, Sep. 15, 1993, abandoned.

[51] Int. Cl.⁶ ............................................. A01D 34/00
[52] U.S. Cl. ................................ 56/17.5; 56/320.1
[58] Field of Search ....................... 56/16.7, 16.8, 56/17.1, 17.3, 17.4, 17.5, 13.4, 255, 295, 320.1, 320.2

[56] References Cited

U.S. PATENT DOCUMENTS

| | | | |
|---|---|---|---|
| 2,876,609 | 3/1959 | Swanson | 56/25.4 |
| 2,888,796 | 6/1959 | Denney | 56/25.4 |
| 3,002,331 | 10/1961 | Denney | 56/25.4 |
| 3,008,283 | 11/1961 | Wood, Jr. | 56/25.4 |
| 3,029,582 | 4/1962 | Halleux | 56/25.4 |
| 3,049,854 | 8/1962 | Denney | 56/25.4 |
| 3,085,386 | 4/1963 | Slemmons | 56/25.4 |
| 3,091,906 | 6/1963 | Hall | 56/25.4 |
| 3,097,467 | 8/1963 | Konrad | 56/25.4 |
| 3,508,385 | 4/1970 | Carlson | 56/25.4 |
| 4,189,903 | 2/1980 | Jackson et al. | 56/255 |
| 4,205,510 | 6/1980 | Raniero | 56/12.9 |
| 4,205,512 | 6/1980 | Thorud | 56/13.4 |
| 4,407,112 | 10/1983 | Sheperd et al. | 56/13.4 |
| 4,450,673 | 5/1984 | Hutchison | 56/17.5 |
| 4,711,077 | 12/1987 | Kutsukabe et al. | 56/17.5 X |
| 5,129,217 | 7/1992 | Loehr | 56/13.6 |
| 5,184,451 | 2/1993 | Savipakka et al. | 56/320.1 X |
| 5,210,988 | 5/1993 | Hojo et al. | 56/255 |
| 5,267,429 | 12/1993 | Kettler et al. | 56/295 |
| 5,299,414 | 4/1994 | Long | 56/17.5 X |

FOREIGN PATENT DOCUMENTS

| | | |
|---|---|---|
| 0580026 | 7/1992 | European Pat. Off. . |
| 2836525 | 1/1980 | Germany . |
| 2028625 | 3/1980 | United Kingdom . |

*Primary Examiner*—Michael Powell Buiz

[57] ABSTRACT

A mowing mechanism having a spindle rotatively driven by a power source, a blade having a radially inner portion coupled for rotation with the spindle and a radially outer portion for cutting vegetation, a housing within which the blade rotates, and a disc operatively carried within the housing for rotation with the blade and having a radially outer portion spaced above the blade. The disc includes an inner portion extending radially inwardly from the outer portion to a position proximate the blade, the inner and outer portions of the disc serving to confine air and clippings near the outer portion of the blade. The rotating disc prevents accumulation of the grass clippings beneath the disc and housing, and enhances airflow within the housing due to viscous drag or friction between the disc and the air within the housing. Deflectors carried by the disc are designed to further enhance airflows and generally deflect clippings back toward the blade for mulching.

9 Claims, 9 Drawing Sheets

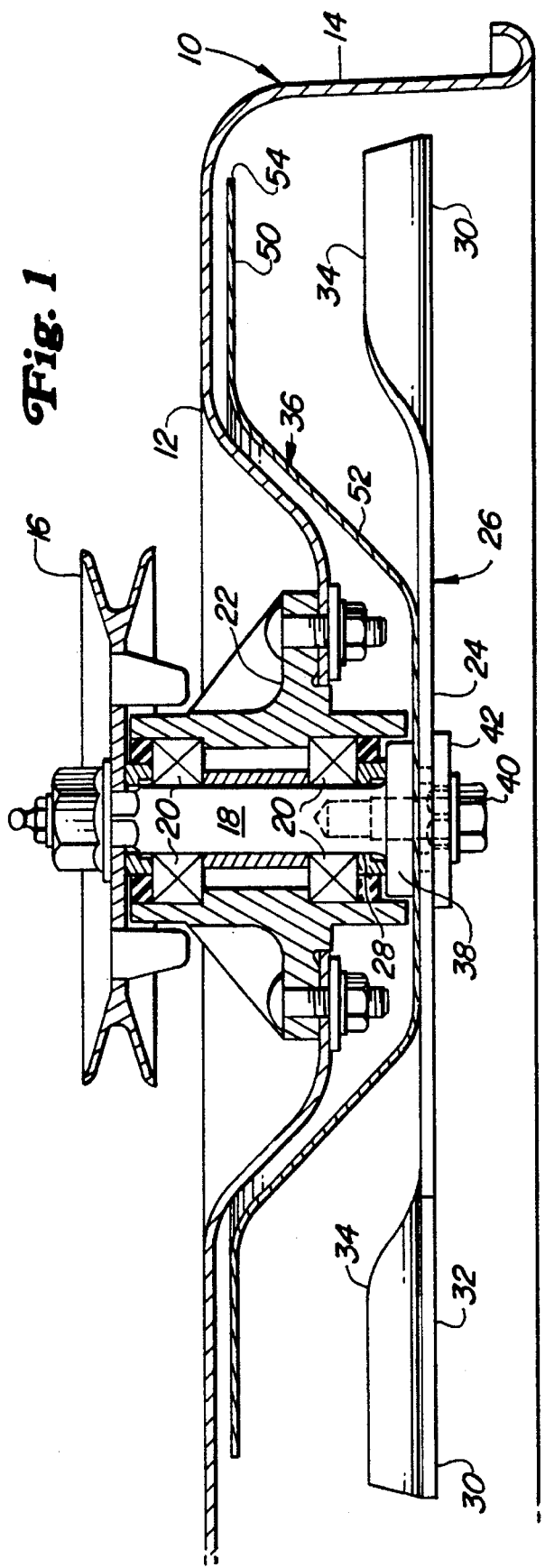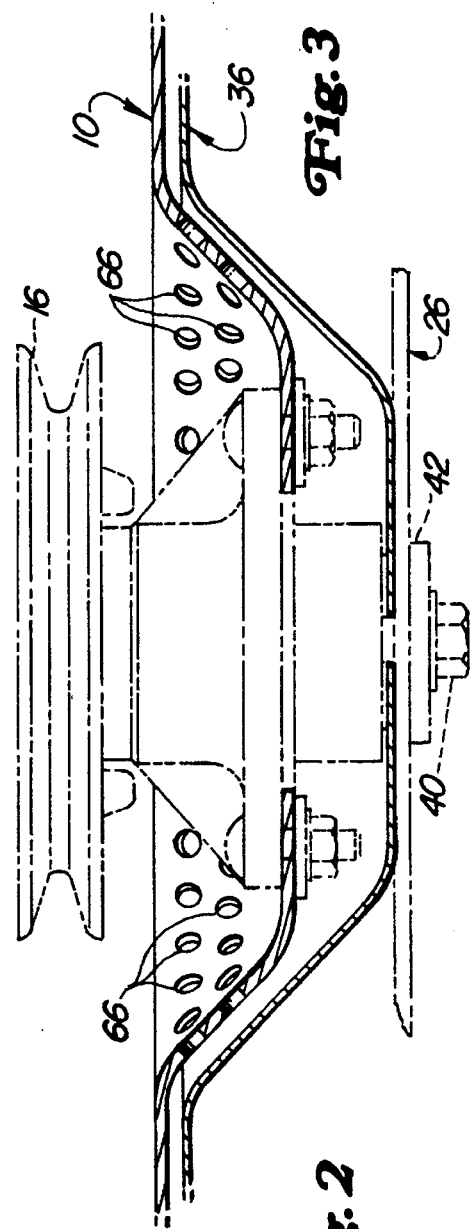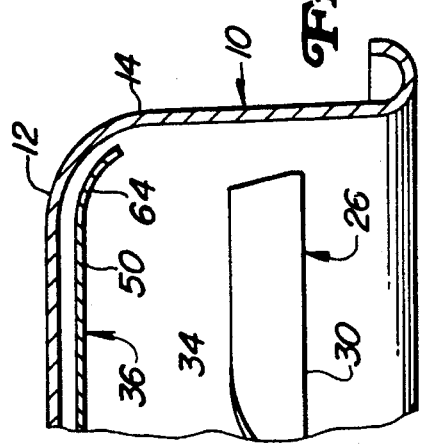

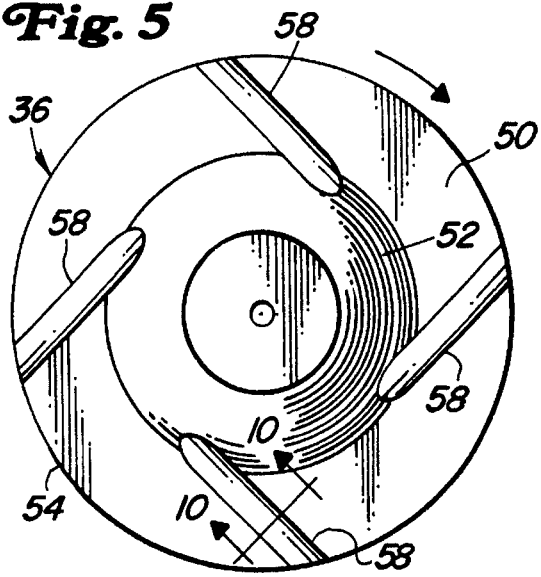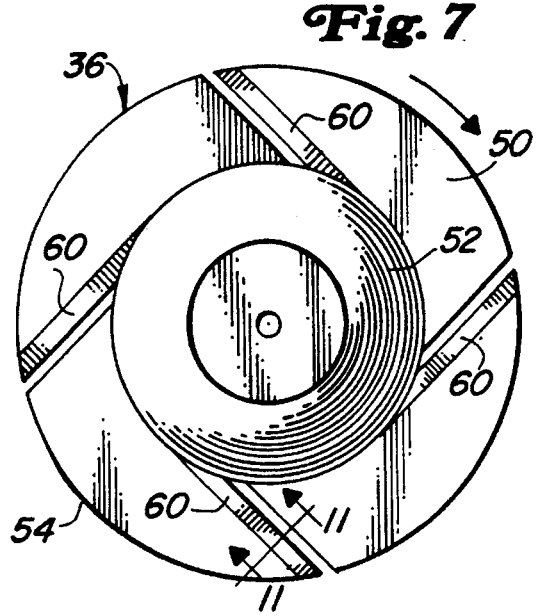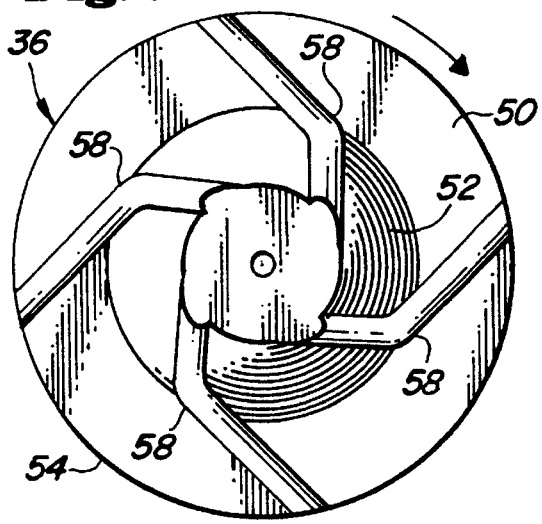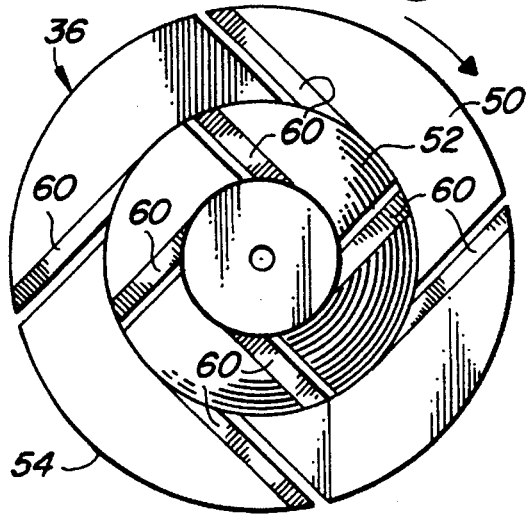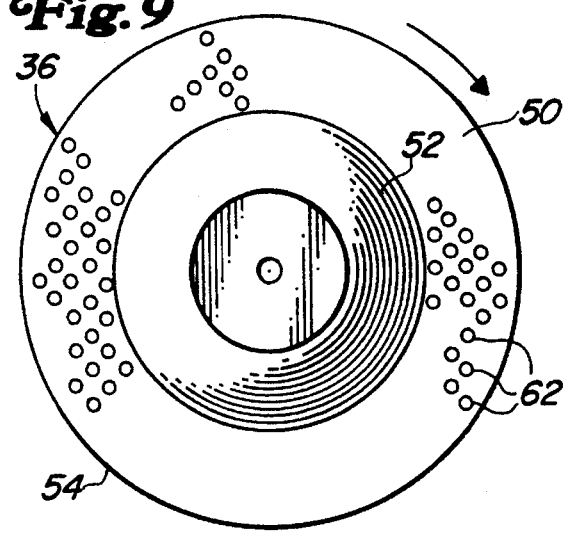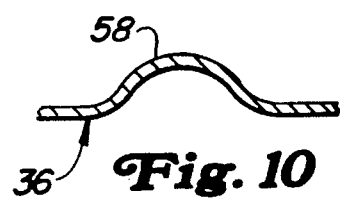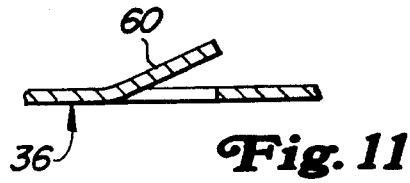

ROTATING MOWER BAFFLE MACHANISM

CROSS-REFERENCE TO RELATED APPLICATIONS

This is a Continuation-In-Part of U.S. patent application Ser. No. 08/121,817, filed Sep. 15, 1993, now abandoned.

BACKGROUND OF THE INVENTION

Typical mowing machines include a housing within which a blade rotates to cut vegetation such as grass. The blade is typically fixed to a spindle rotatively driven by a power source such as an engine. Many mowers provide a discharge outlet in the housing through which clippings exit the housing. Other mowers mulch the clippings by preventing them from exiting the housing. These mulching mowers block the discharge outlet, thereby cutting and re-cutting the clippings within the housing until they fall into the lawn in relatively small fragments.

Conventional mowers typically tend to accumulate grass clippings which stick to the underside of the deck. This accumulation of clippings can be caused by mowing wet grass, and also due to the fact that clippings can become sticky when cut. Excessive accumulation of clippings within the housing can cause clogging near or in the discharge outlet. The clippings can even build-up to a point where rotation of the blade or spindle is hindered. Furthermore, the accumulated clippings stuck to the underside of the housing can create resistance to the flow of air and clippings within the housing such that the discharge of clippings through the discharge outlet is generally hindered. The insufficient discharge of materials through the outlet can result in unsightly windrowing or clumping of grass clippings on the lawn. Some mowers provide extra large wings on the mower blade for directing a larger amount of air out through the discharge outlet. However, larger wings tend to undesirably increase the amount of noise generated by the mower.

Mulching mowers tend to experience particularly large accumulation of clippings beneath their mower decks. The mulching mowers cut and re-cut the clippings into small fragments which can more readily adhere to surfaces within the housing. Also, since mulching mowers generally do not provide a discharge outlet for clippings, the clippings recirculate and are suspended within the deck for a longer period of time, which gives the clippings more opportunity to become stuck or adhere to the underside of the deck.

It would therefore be desirable to provide a mowing mechanism which generally hinders clippings from sticking to or otherwise accumulating on the underside of the deck. It would also be desirable for such a mower to maintain a relatively large volume of air and clippings being expelled through the discharge outlet. Furthermore, it would be desirable to provide a mower which generates a relatively low amount of noise during operation.

SUMMARY OF THE INVENTION

The preferred embodiment of the present invention provides a disc or baffle positioned above a mower blade within a housing. The blade includes a cutting edge and a trailing upturned wing for generating airflows and updrafts within the housing. The baffle has an outer portion spaced above the cutting portion of the blade. An inner portion of the baffle extends generally inwardly and downwardly from the outer portion to a position proximate the blade. The general shape or configuration of the baffle serves to confine air and clippings flowing within the housing to an area proximate the cutting portion of the blade, and thereby keeps the air and clippings contained in an area within the housing which has relatively high velocity airflows. The high velocities enhance the discharge of clippings from the housing. The rotation of the baffle also serves to increase the airflow in the housing due to viscous drag or friction between the baffle and the flowing air, thereby further increasing the airflow within the housing. The higher airflows created by the rotating baffle allow a smaller wing to be utilized on the blade, thereby decreasing the noise generated by the mower. Centrifugal forces imparted to clippings by the baffle generally prevent the clippings from accumulating on the underside of the baffle. Alternative embodiments include deflectors formed in the baffle which are designed to enhance the flow of clippings and air within the housing. Air inlets formed in the top wall of the housing are designed to allow air to enter the space between the baffle and the top wall of the housing for enhancing the airflow within the housing during mulching operations. Another alternative embodiment includes a stationary baffle which generally extends around the periphery of the cutting blades, and acts to direct clippings inwardly toward the rotating baffle where they are futher directed downwardly into the blade for re-cutting.

BRIEF DESCRIPTION OF THE DRAWINGS

FIG. 1 is a side view of the preferred embodiment of the present invention.

FIG. 2 is a partial side view of an alternative embodiment of the present invention including a lip 64 formed at the outer edge of the disc 36.

FIG. 3 is an alternative embodiment of the present invention including openings 66 in the housing 10.

FIG. 5 is a plan view of an alternative embodiment of the disc 36 according to the present invention, and which includes ribs 58 formed in the outer portion 50 of the disc 36.

FIG. 6 is a plan view of an alternative embodiment of the disc 36 according to the present invention, and which includes ribs formed in both the inner 52 and outer 50 portions of the disc 36.

FIG. 7 is a plan view of an alternative embodiment of the disc 36 according to the present invention, and which includes tabs 60 formed in the outer portion 50 of the disc 36.

FIG. 8 is a plan view of an alternative embodiment of the disc 36 according to the present invention, and which includes tabs 60 formed in the inner 52 and outer 50 portions of the disc 36.

FIG. 9 is a plan view of an alternative embodiment of the disc 36 which includes openings 62 in the outer portion 50 of the disc 36.

FIG. 10 is a sectional view of the ribs 58 shown in FIGS. 5 and 6.

FIG. 11 is a sectional view of the tabs 60 shown in FIGS. 7 and 8.

DESCRIPTION OF THE PREFERRED EMBODIMENT

Figure 4:
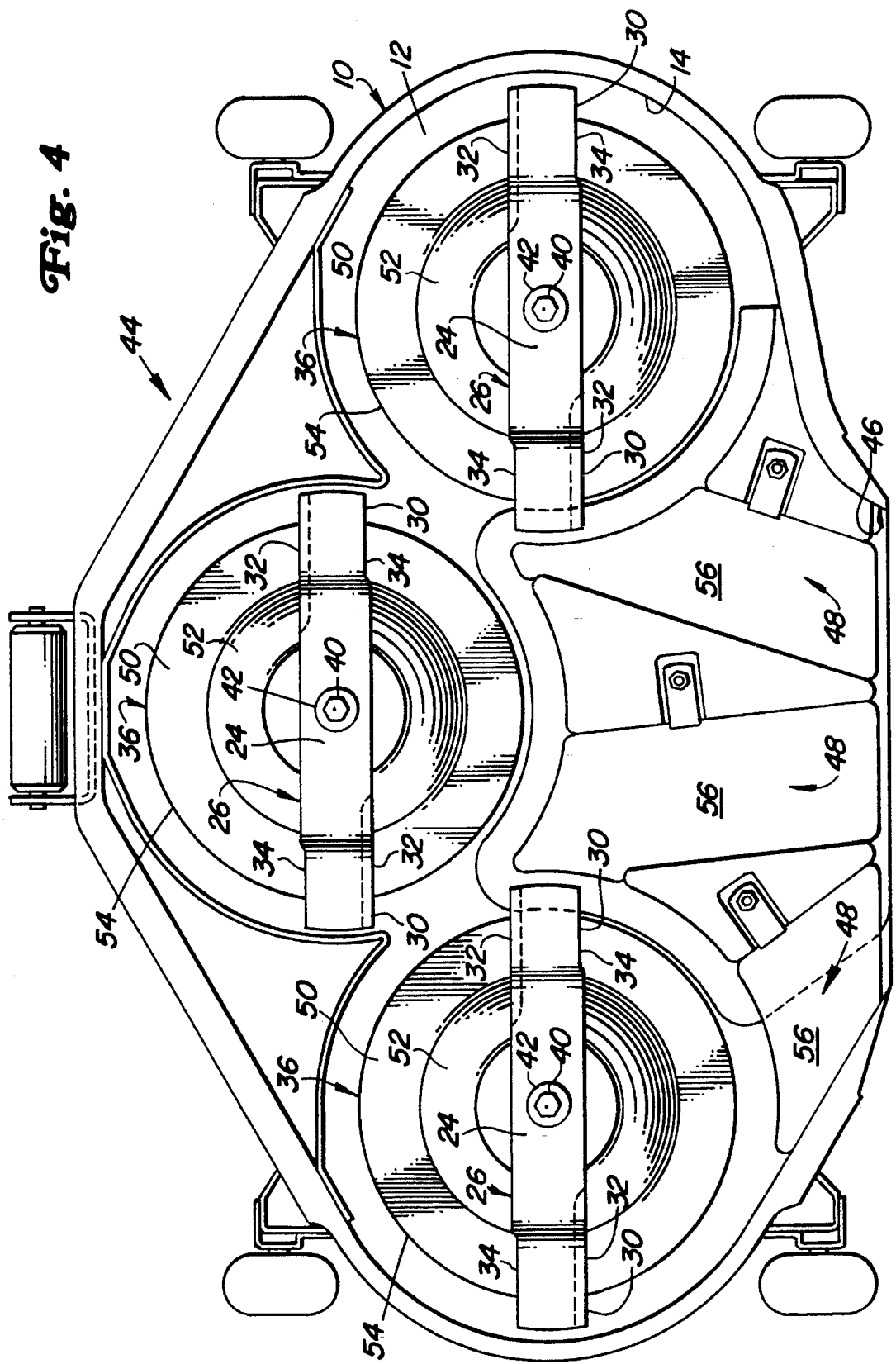
FIG. 4 is a view from beneath a rear discharge mower deck having discs 36 according to the present invention operatively positioned within the cutting chambers.

Referring now to FIGS. 1, there is shown the preferred embodiment of the present invention. A housing 10 having a top wall 12 and downwardly extending side walls 14 is provided which can be coupled with a tractor vehicle having a power source. The vehicle's power source operatively drives a belt which engages a pulley 16. A spindle 18 is fixed for rotation with the pulley 16 and is operatively supported by bearings 20 within a spindle housing 22. The spindle housing 22 is bolted to the top wall 12 of the housing 10. The radially inner portion 24 of a mower blade 26 is coupled with the lower end portion 28 of the spindle 18. The radially outer end portion 30 of the blade 26 includes a cutting edge 32 for mowing vegetation and a trailing wing portion 34 for impelling air and clippings upwardly.

The preferred embodiment provides a baffle or disc member 36 which is coupled for rotation with the spindle 18 and blade 26 within the housing 10. The disc 36 is positioned between the top surface of the mower blade 26 and a shoulder portion 38 defined by the spindle 18. A bolt 40 is received by the lower end portion 28 of the spindle 18 and presses a blade washer 42 upwardly against the blade 26. The bolt 40 thereby presses the blade washer 42, blade 26 and disc 36 upwardly against the shoulder portion 38. The blade 26 and disc 36 are thereby fixed for rotation with the spindle 18. Other means for coupling the disc 36 to the spindle 18 or blade 26 could also be employed, such as by welding the disc 36 to the spindle 18, by providing an irregular shaped opening such as a hex in the disc 36 which mates with a shape formed in the spindle 18, or by bolting the disc 36 to the blade 26 near the spindle 18.

According to the preferred embodiment and as seen in FIG. 4, a disc 36 is coupled with each spindle 18 of a three spindle mower deck 44. A rear discharge opening 46 is provided, and includes separate discharge channels 48 through which the grass clippings pass after exiting the cutting chambers on their way to the discharge outlet 46. The rear discharge mower deck 44 shown in FIG. 4 is described in greater detail in U.S. Pat. No. 5,267,429, which is incorporated herein by reference. The present invention, however, is also usable with mower deck housings other than that shown in FIG. 4, such as single spindle decks, mulching mowers, side discharge mower decks, or walk behind mowers.

Next, the operation of the preferred embodiment will be discussed. As the blade 26 rotates within the housing 10 grass and vegetation are cut by the leading cutting edge 32 of the outer portion 30 of the blade 26. The trailing wing portion 34 impels grass clippings upwardly and generally creates an updraft as it rotates within the housing 10. Some of the grass clippings which are moving upwardly in the housing 10 contact the disc 36 which is rotating at the same speed as the blade 26. However, the clippings do not tend to stick or accumulate on the underside of the disc 36 since it is moving generally with the blade 26. The centrifugal force of the rotating disc 36 is imparted to the clippings contacting the disc 36 and acts to generally throw the clippings outwardly and generally prevent clippings from sticking to the underside of the disc 36.

The motion of the disc 36 also acts to enhance the velocity of air and clippings within the housing 10. Viscous drag or friction between the underside of the disc 36 and the air within the housing 10 will tend to increase the speed of the air. The general configuration of the disc 36 also helps enhance the airflow. The disc 36 includes a first outer portion 50 which is spaced from the top of the blade 26, and a second inner portion 52 which extends inwardly and downwardly from the outer portion 50 to abut the blade 26. The disc 36 thereby serves to contain or confine a particular volume of air within the housing 10 near the outer portion 30 of the blade 26 generally near the trailing wing 34 of the blade 26. The disc 36 acts to create a channel wherein airflow in the housing 10 is relatively large. By preventing or blocking the high speed air from flowing to locations that would have less airflow, such as near the center of the housing 10 near the spindle 18, a large portion of the air within the housing 10 maintains its relatively high speed. The resulting high airflow within the housing 10 generally enhances the discharge of clippings through the discharge outlet 46. The general shape of the disc 36 prevents clippings from being propelled to the center of the housing 10 near the spindle 18 and spindle housing 22 where the airflow would otherwise be relatively low and where clippings would be prone to accumulate on the spindle housing 22 and associated hardware located within the deck 10. Air resistance due to clippings buildup near the spindle 18 at the center of the blade 26 is thereby reduced or eliminated, resulting in enhanced airflow velocities and discharges.

The outer edge 54 of the disc 36 shown in FIGS. 1 and 4 terminates at a location substantially above the blade 26. A gap is thereby established between the blade 26 and the disc 36 through which clippings and air may flow to exit the housing 10 through the discharge outlets 46 at the rear of the housing 10.

The relatively high airflows which result from the use of the disc 36 according to the present invention generally allow a relatively small trailing wing section 34 to be utilized on the blade 26. The noise level of the blade 26, which is largely attributable to the blade's wing portion 34, is thereby generally reduced.

As shown in FIG. 4, the housing 10 with which the preferred embodiment is used can be provided with inserts 56 which block a portion of the discharge channels 48 for providing a mulching feature. Airflow through the discharge channels 48 is thereby restricted. In this mode the rotating discs 36 continues to prevent the accumulation of clippings on the underside of the deck or mower.

Several modifications to the preferred embodiment described above are contemplated within the spirit of the present invention. A first alternative embodiment is shown in FIG. 5. The disc 36 shown in FIG. 5 includes deflectors or ribs 58 formed in the generally horizontal outer portion 50 of the disc 36, although the deflectors 58 could also be welded or otherwise fixed to the underside of the disc 36. The deflectors 58, shown in a sectional view in FIG. 10, extend downwardly from the disc 36 and are designed to grab, direct or otherwise deflect air and clippings such that airflow in the direction of the blade 26 is generally enhanced. The ribs 58 are also intended to enhance the deck's mulching capability by forcing clippings downwardly back into the blade 26 for re-cutting. FIG. 6 shows an alternative embodiment having deflectors or ribs 58 formed in the generally horizontal outer portion 50 of the disc and also the downwardly sloping inner portion 52 of the disc 36. These ribs 58 on the inner portion 52 of the disc 36 are also intended to enhance airflow and mulching within the housing 10. FIG. 7 shows another embodiment having punched tabs 60 extending downwardly from the generally horizontal outer portion 50 of the disc 36. FIG. 11 shows a sectional view of the tabs 60. Like the ribs 58 mentioned above, the tabs 60 are designed to direct air in the general direction of the blade 26 to enhance airflow, and to deflect clippings downwardly back into the blade 26 for further mulching and recutting. FIG. 8 shows a disc 36 having tabs 60 formed in the outer portion 50 of the disc 36 and also the inner sloped portion 52 of the disc 36. The tabs 60 formed on the inner portion 52 of the disc 36 are added to direct air and clippings in the direction of blade rotation and downwardly into the blade for re-cutting.

FIG. 9 shows a disc 36 having holes 62 formed in the outer portion thereof and which are intended to direct air and clippings in the direction of blade rotation. The openings or gaps 62 also decrease the mass of the rotating disc 36 such that the inertia of the disc 36 will be decreased. The relatively low inertia of the rotating disc 36 is intended to extend the operating life of the blade clutch which initiates blade rotation and which halts the blade 26 when blade rotation must be quickly stopped. The openings 62 are also designed to deflect air and clippings in the direction of blade rotation, and to deflect air and clippings generally downwardly for re-cutting by the blade 26.

The embodiment shown in FIG. 2 includes a downturned lip 64 formed at the outer radial edge of the disc 36. The disc 36 shown in FIG. 2 conforms generally closely to the shape and contour of the housing 10, and acts to channel the high velocity air flowing within the housing 10.

The various embodiments of the disc 36 shown in FIGS. 1–10 can be manufactured from metal materials by various processes such as stamping of sheet metal. The discs 36 could also be manufactured from plastic or composite materials such that the deflectors, ribs 58, tabs 60 or openings 62, could be molded into the disc 36 during its manufacture.

In the embodiment shown in FIG. 1, viscous drag and centrifugal force which is applied to the air between the disc 36 and the top wall 12 of the housing 10 may act to throw some of this air outwardly away from the spindle 18, thereby creating a partial vacuum between the disc 36 and the top wall 12 of the housing 10. FIG. 3 shows a housing 10 which includes a plurality of holes or openings 66 which allow air to enter the housing 10 between the disc 36 and the top wall 12 of the housing 10. The openings 66 formed in the top wall 12 of the housing 10 are designed to allow the viscous drag and centrifugal force applied to the air above the disc 36 to draw in air through the openings 66 from the atmosphere. The mechanism shown in FIG. 3 is therefore intended to direct the air above the disc 36 outwardly and into the stream of high velocity air beneath the disc 36 near the side walls 14 of the housing 10, thereby enhancing the airflow within the housing 10 as well as the discharge of materials through the discharge outlet 48. The outward flow of air above the disc 36 is also intended to hinder clippings from becoming lodged between the disc 36 and the housing 10. The openings 66 may be particularly advantageous in a mulching mode when the discharge outlets 48 are at least partially closed. Closure of the outlets 48 can decrease the movement of air out of the housing 10, and therefore air is prevented from entering the housing 10. Since little or no air is flowing into the housing 10 there is little or no updraft for lifting the grass which is about to be cut. Cut quality can therefore be negatively affected. The air inlets or openings 66 in the housing 10 shown in FIG. 3 are designed to allow air to enter the housing 10 for creating an updraft for the beneficial lifting of the grass which is about to be cut.

Figure 12:
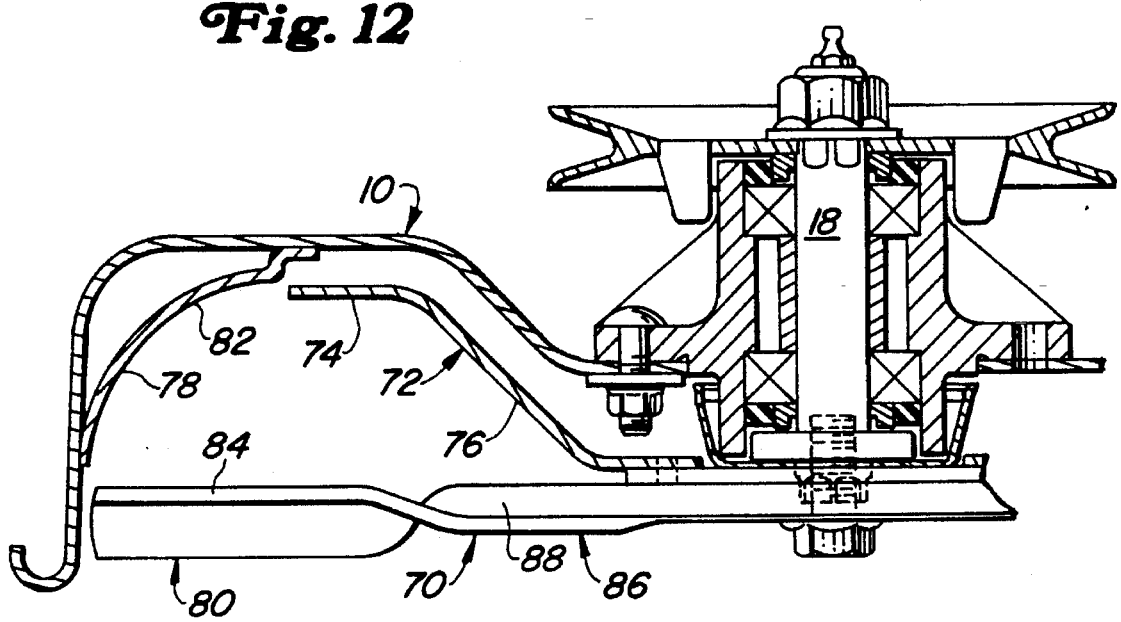
FIG. 12 is a sectional view of the front portion of an alternative embodiment having a rotating baffle and a fixed or stationary baffle.
Figure 13:
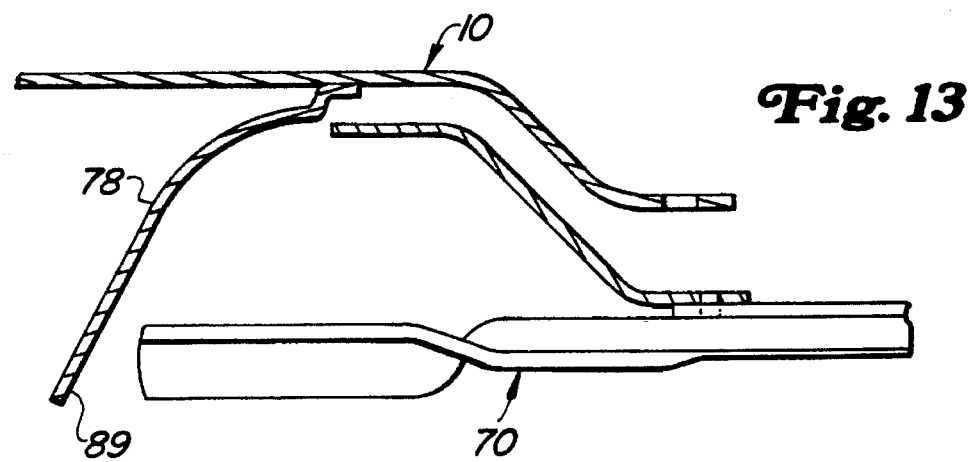
FIG. 13 is a sectional view of the alternative embodiment of FIG. 12, and showing the rear portion of the mower deck.

Referring now to FIGS. 12–22, there is shown an alternative embodiment of the present invention which is particularly adapted for mulching. FIG. 12 is a view from behind a blade 70 as it rotates within a mower deck housing 10. The mulching blade 70 is supported and driven by a spindle 18. A baffle or disc member 72 is coupled with the blade 70 for rotation therewith. The disc 72 includes a radially outer portion 74 and a radially inner portion 76. The radially outer portion 74 is spaced above the blade 70, and the inner portion 76 extends inwardly and downwardly from the outer portion 74 to a position proximate the blade 70. The inner portion 76 extends obliquely with respect to the blade 70. Also included in this alternative embodiment is a stationary baffle 78 which generally extends around the entire periphery of the cuttting blade 70. The stationary baffle 78 is positioned above the outer portion 80 of the blade 70, and includes a surface 82 which extend generally obliquely with respect to the blade 70. As grass is cut by the outer portion 80 of the blade 70, a trailing upturned wing portion 84 directs clippings and air upwardly against the stationary baffle 78. The surface 82 of the stationary baffle 78 can then direct or deflect the air and clippings inwardly toward the inner portion 76 of the disc 72. The inner portion 76 of the disc 72 can then direct air and clippings downwardly toward the inner mulching portion 86 of the blade 70, which includes a leading cutting edge and a downturned wing portion 88. The inner portion 86 of the blade 70 acts to re-cut or mulch the clippings and direct them downwardly for being deposited on the ground. FIG. 13 shows a sectional view of a rear portion of the housing 10. The stationary baffle 78 shown in FIG. 13 is positioned at the rear of the housing 10 and has a lower edge portion 89 which extends outwardly from the spindle 18 slightly more than does the stationary baffle 78 and housing at the front and side portions to thereby allow more clippings to be deposited onto the ground at that location.

Figure 14:
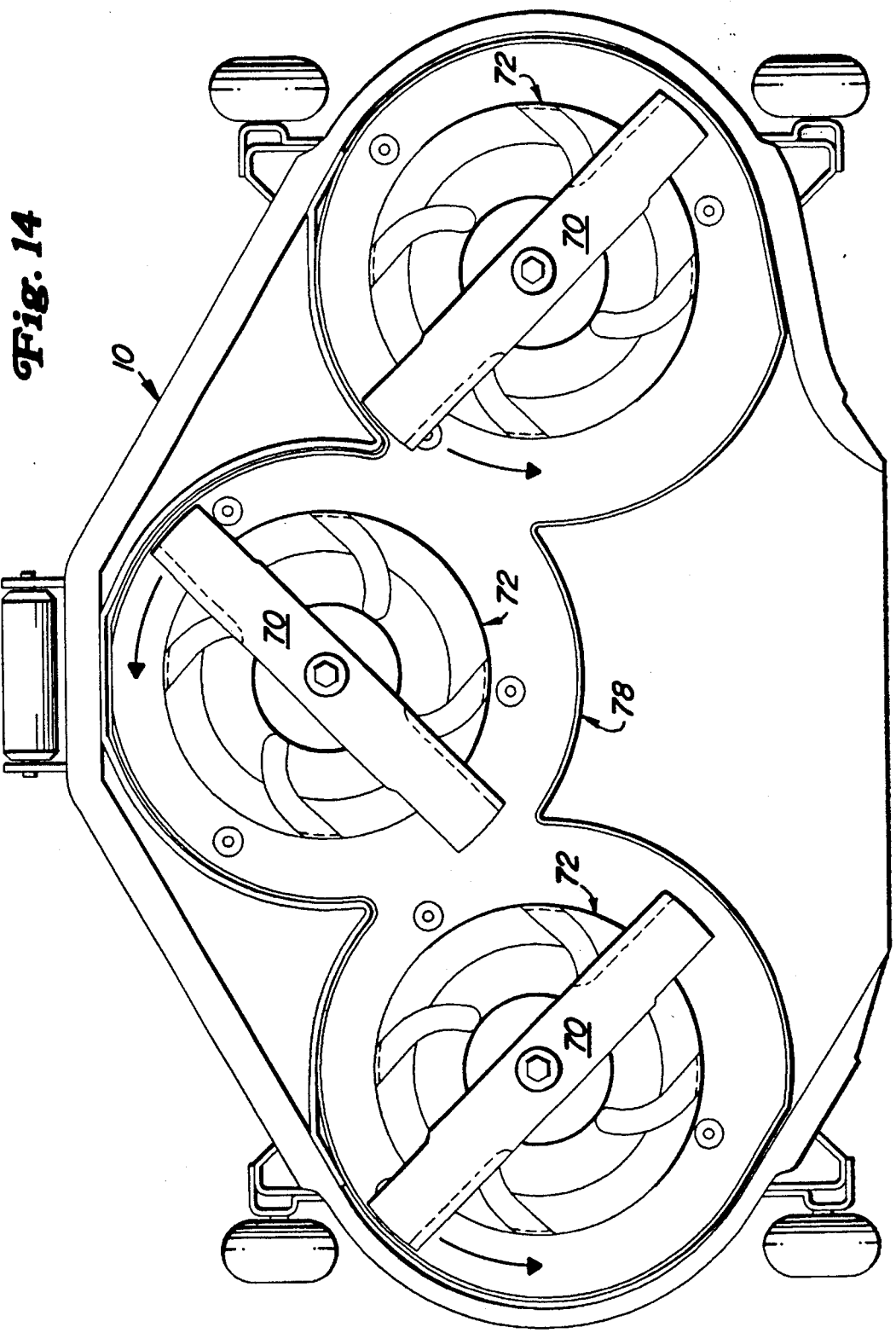
FIG. 14 is a view from beneath the mower deck having the stationary baffle of FIGS. 12 and 13.
Figure 15:
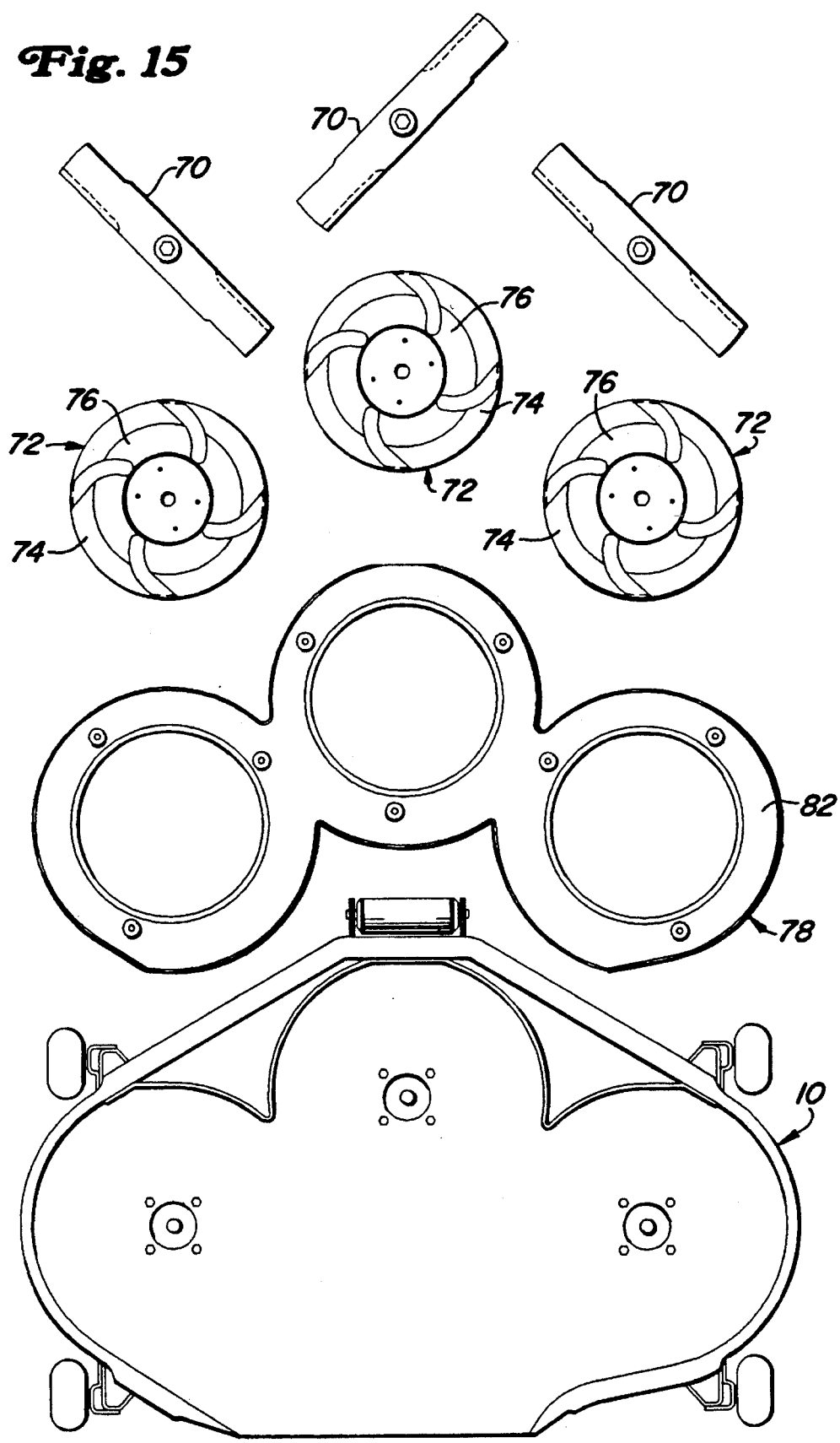
FIG. 15 is an exploded view from beneath the mower deck having rotating baffles as shown in FIGS. 12–14.
Figure 16:
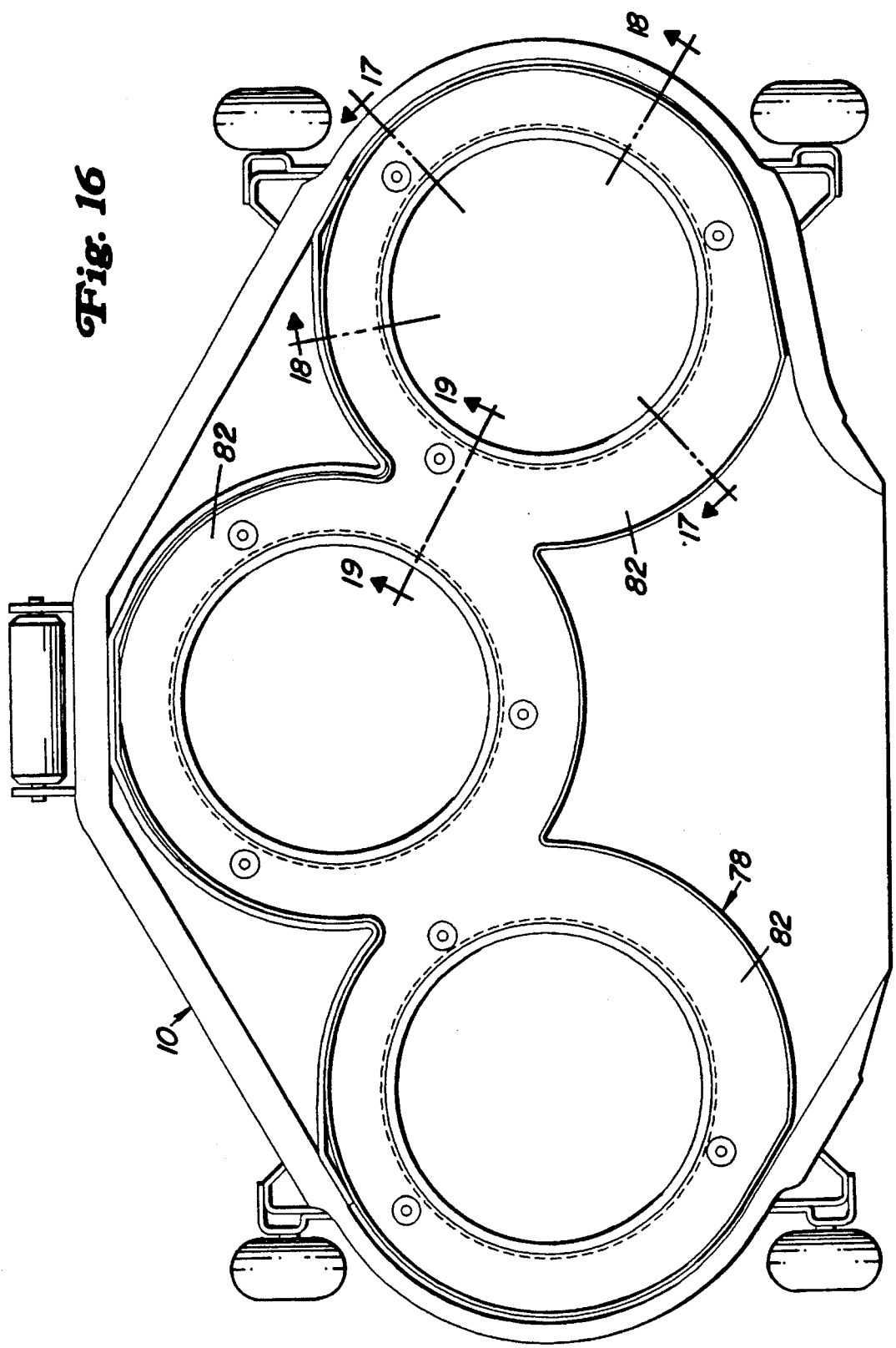
FIG. 16 is a view from beneath the mower deck with the blades and rotating baffle removed for clarity.
Figure 17:
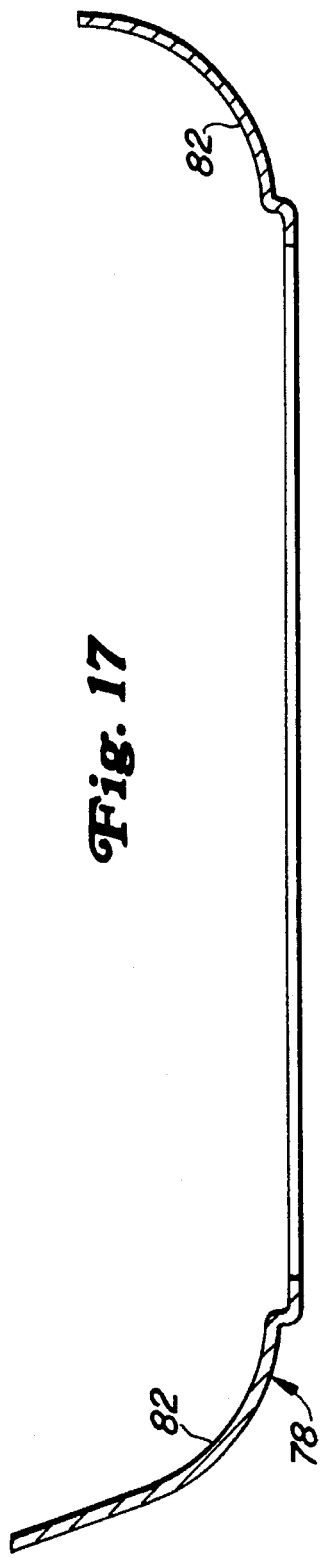
FIG. 17 is a sectional view of the stationary baffle taken along line 17—17 in FIG. 16.
Figure 18:
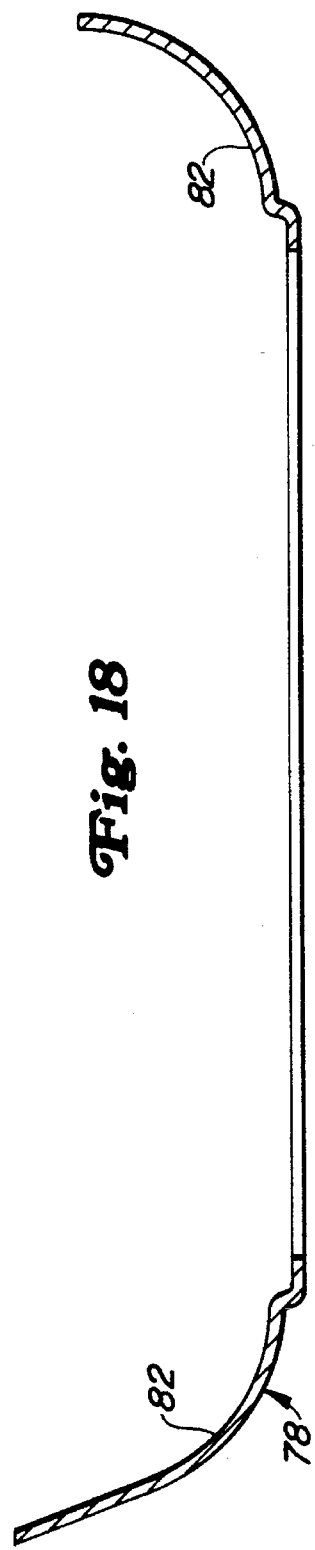
FIG. 18 is a sectional view of the stationary baffle taken along line 18—18 in FIG. 16.
Figure 19:
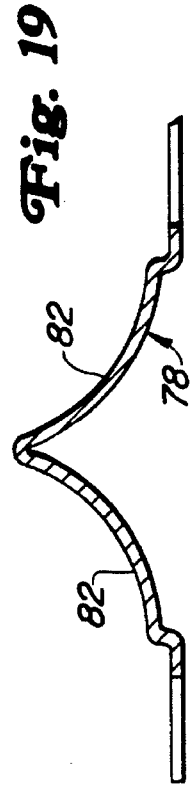
FIG. 19 is a sectional view of the stationary baffle taken along line 19—19 in FIG. 16.

FIGS. 14 and 15 show the underside of a multi-spindle deck 10 according to the alternative embodiment of FIGS. 12 and 13. The stationary baffle 78 according to the preferred embodiment is a single piece which generally encloses or generally extends around the periphery or circumference of each of the three mower blades 70 within the housing 10. FIG. 16 shows the underside of the single-piece stationary baffle 78 positioned within the housing 10 without the blades 70 and rotating discs 72. As can be seen from FIGS. 17–19 which show cross sections of the overturned deck illustrated in FIG. 16, the stationary baffle 78 includes deflecting surfaces 82 which when installed extend downwardly from the top wall of the housing 10 and which are oblique with respect to the blade 70 when installed. The deflecting surface 82 generally extends around the entire periphery or circumference of each mower blade 70.

Figure 21:
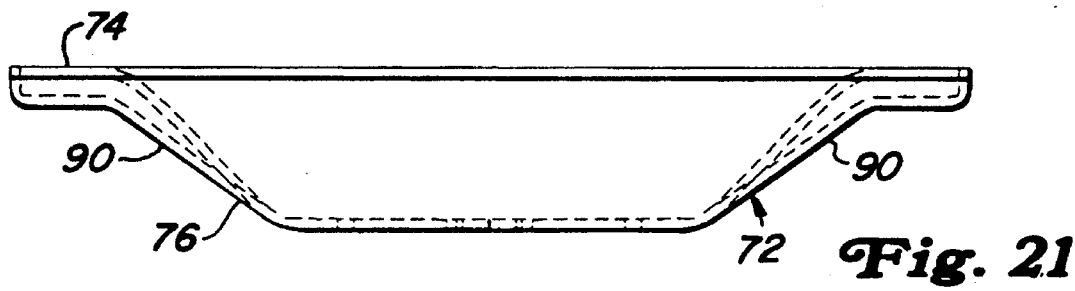
FIG. 21 is a side view of the rotating disc shown in FIG. 20.
Figure 20:
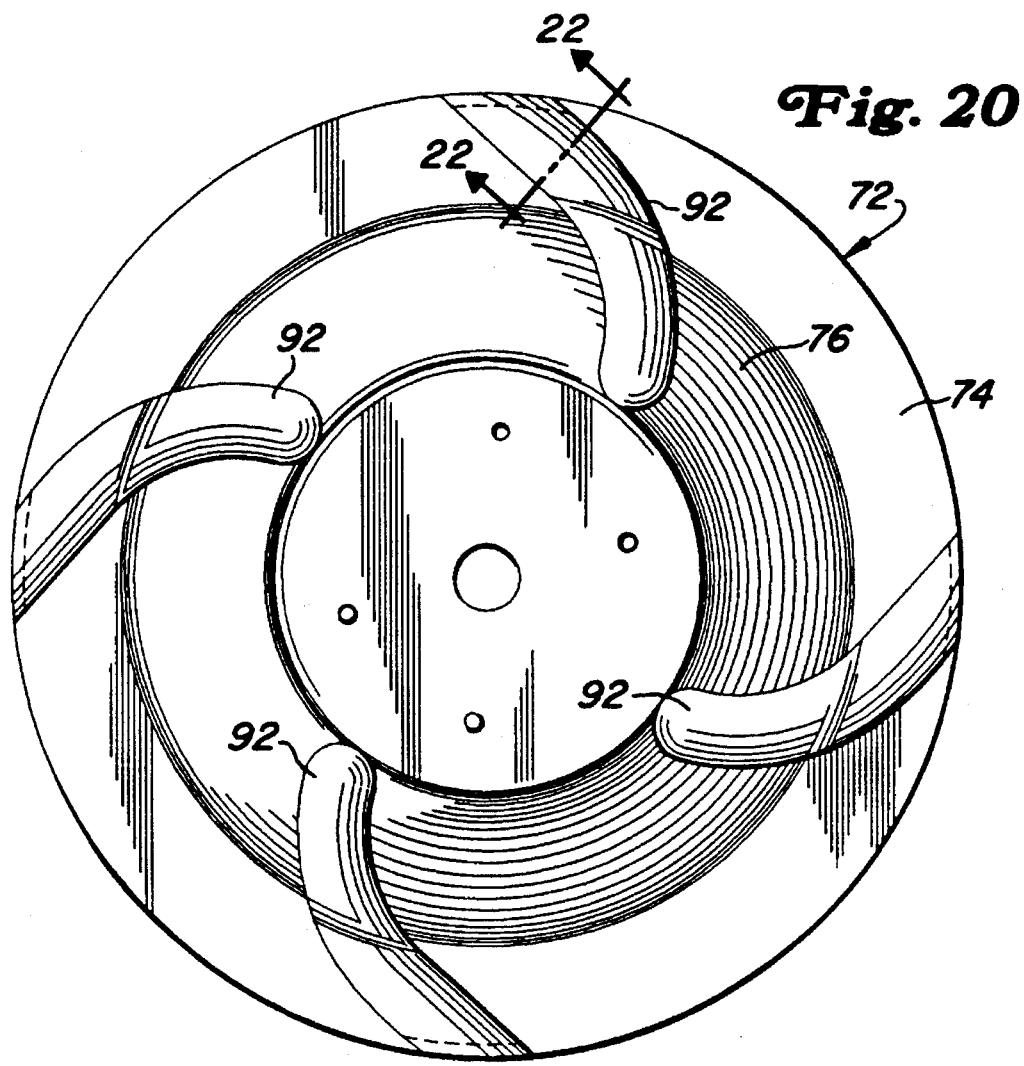
FIG. 20 is a plan view of the rotating disc as shown in FIGS. 12–15.
Figure 22:
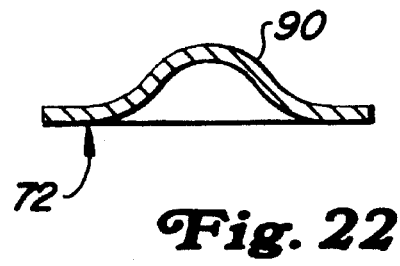
FIG. 22 is a sectional view of the deflector member taken along line 22—22 in FIG. 20.

Referring now to FIGS. 20–22, there is shown in greater detail the rotating disc 72 of the embodiment of FIGS. 12–19. As seen in FIGS. 20–22, a plurality of deflector members 90 extend downwardly from the disc 72. As the air and clippings are directed inwardly from the stationary baffle 78 and against the inner portion 76 of the rotating disc 72, the deflector members 90 will act to further direct the air and clippings downwardly toward the inner mulching portion 86 of the blade 70. A sectional view of a deflector member 90 is shown in FIG. 22, and illustrates how the deflector member 90 extends downwardly from the surface of the disc 72 during operation. The disc 72 can be manufactured of a plastic material.

We claim:

1. A mower mechanism comprising:

a rotatively driven spindle, a blade having a radially inner portion coupled for rotation with the spindle and a radially outer portion for cutting vegetation, said outer portion having an upturned portion for directing air and clippings upwardly, a housing within which the blade rotates, a stationary baffle positioned generally above the outer portion of the blade, said stationary baffle extending obliquely with respect to the blade such that the air and clippings directed upwardly from the outer portion of the blade strike the stationary baffle and are directed radially inwardly, a disc operatively carried within the housing for rotation with the blade and having a radially outer portion spaced above the blade, said disc including an inner portion extending radially inwardly from the outer portion of the disc, said inner portion extending obliquely with respect to the blade such that the air and clippings directed inwardly from the stationary baffle can strike the inner portion of the disc and be directed downwardly toward the blade.

2. The invention of claim 1, wherein said inner portion of the disc extends inwardly and downwardly from the outer portion of the disc and to a position proximate the blade.

3. The invention of claim 1, whereing said inner portion of the disc directs air and clippings toward an inner portion of the blade, said inner portion of the blade having a leading cutting edge and a trailing downwardly extending portion for directing air and clippings downwardly.

4. The invention of claim 1, wherein the stationary baffle extends around the entire circumference of the blade.

5. The invention of claim 4, wherein a rear portion of the stationary baffle extends downwardly and to the rear for allowing a portion of the air and clippings circulating within the housing to escape.

6. The invention of claim 1, wherein the disc further includes at least one deflector member which extends downwardly from the disc for directing air and clippings downwardly.

7. The invention of claim 6, wherein said deflector is carried by the inner portion of the disc.

8. The invention of claim 1, wherein the housing supports a plurality of spindles and blades, and said stationary baffle extends along the general periphery of the path of travel of the plurality of blades.

9. A mower mechanism comprising:

a rotatively driven spindle, a blade having a radially inner portion coupled for rotation with the spindle and a radially outer portion for cutting vegetation, said inner portion of the blade having a leading cutting edge and a downwardly extending wing portion for directing air and clippings downwardly, said outer portion having an upturned wing portion for directing air and clippings upwardly, a housing within which the blade rotates, a stationary baffle positioned generally above the outer portion of the blade, said stationary baffle extending obliquely with respect to the blade such that the air and clippings directed upwardly from the outer portion of the blade can strike the stationary baffle and be directed radially inwardly, a disc operatively carried within the housing for rotation with the blade and having a radially outer portion spaced above the blade, said disc including an inner portion extending radially inwardly from the outer portion of the disc, said inner portion extending obliquely with respect to the blade such that the air and clippings directed inwardly from the stationary baffle strike the inner portion of the disc and are directed downwardly toward the blade, and wherein said inner portion of the disc extends inwardly and downwardly from the outer portion of the disc to a position proximate the blade for directing air and clippings toward an inner portion of the blade.

\* \* \* \* \*

UNITED STATES PATENT AND TRADEMARK OFFICE
CERTIFICATE OF CORRECTION

PATENT NO. : 5,483,790
DATED : 16 January 1996
INVENTOR(S) : John Boyd Juhn et al.

It is certified that error appears in the above-indentified patent and that said Letters Patent is hereby corrected as shown below:

In the title: --delete "Machanism" and insert --mechanism--.

Col. 7, line 42, delete "whereing" and insert --wherein--.

Signed and Sealed this

Thirtieth Day of July, 1996

Attest:

BRUCE LEHMAN

*Attesting Officer*   *Commissioner of Patents and Trademarks*